United States Patent [19]

Hattori et al.

[11] Patent Number: 4,808,065

[45] Date of Patent: Feb. 28, 1989

[54] APPARATUS FOR CHANGING POSTURE OF GREEN EXTRUDED BODY

[75] Inventors: Isao Hattori, Nagoya; Akio Enomoto, Chita, both of Japan

[73] Assignee: NGK Insulators, Ltd., Aichi, Japan

[21] Appl. No.: 163,206

[22] Filed: Feb. 26, 1988

Related U.S. Application Data

[63] Continuation of Ser. No. 843,731, Mar. 25, 1986, abandoned.

[30] Foreign Application Priority Data

Mar. 29, 1985 [JP]  Japan .................................. 60-63387

[51] Int. Cl.$^4$ ............................................. B65G 47/24
[52] U.S. Cl. ..................................... 414/774; 198/406
[58] Field of Search ............... 198/406, 407, 409, 403, 198/468.6; 414/759, 774, 38, 33, 55, 56

[56] References Cited

U.S. PATENT DOCUMENTS 3,982,750  9/1976  Pulda .................................... 414/774
4,439,929  4/1984  Kitagawa et al. .

FOREIGN PATENT DOCUMENTS 2447777  4/1975  Fed. Rep. of Germany .
3311542  10/1984  Fed. Rep. of Germany .

Primary Examiner—Frank E. Werner
Assistant Examiner—Cheryl L. Gastineau
Attorney, Agent, or Firm—Parkhurst, Oliff & Berridge

[57] ABSTRACT

The apparatus is for changing the posture of green extruded bodies which have been shaped into predetermined configuration. The apparatus includes a rotatable first table for receiving and supporting the green extruded body in an extruded posture, a rotatable second table for receiving the extruded body in a standing posture from the first table, and a mechanism for rotating the first and second tables while maintaining them perpendicular to each other during the transfer operation.

3 Claims, 3 Drawing Sheets

FIG_2
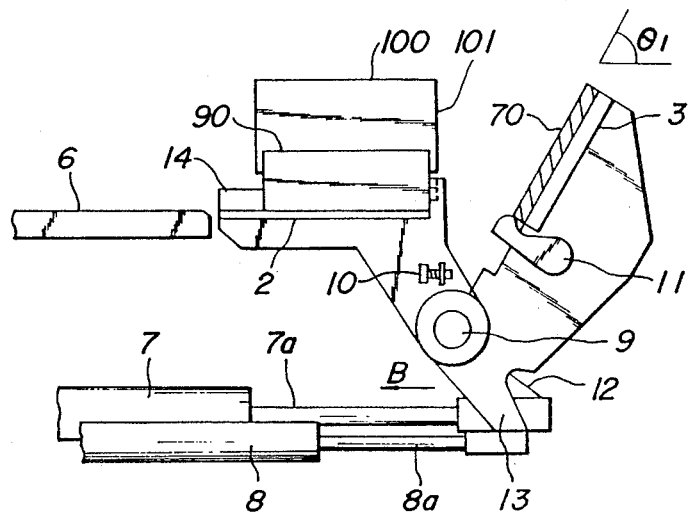
FIG_3
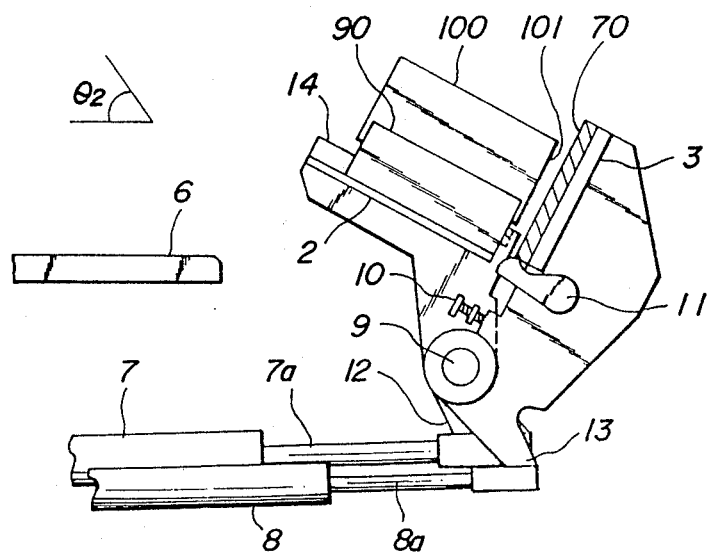

APPARATUS FOR CHANGING POSTURE OF GREEN EXTRUDED BODY

This is a continuation of application Ser. No. 843,731, filed Mar. 25, 1986, now abandoned.

BACKGROUND OF THE INVENTION

1. Field of the Invention

This invention relates to an apparatus for changing the posture of a soft and deformable green extruded body without providing a shock and external force to the body.

2. Related Art Statement

In the manufacture of the extrusion molded articles, for example, ceramic honeycomb bodies, a green extrusion molded body which is continuously horizontally extruded on a receiving table through the extruder is cut into the single bodies of a predetermined length by the cutting means, then each single body, hereinafter simply called a green extruded body, is dried by the dryer and then sintered in the furnace; of course, further various procedures may be involved in addition to the above described procedure.

The green extruded body, after the cutting procedure, has a posture of parallel through holes extending horizontally. In other words, the cut end surfaces of the green body are perpendicualr to a horizontal plane. In this posture, the green extruded body is not easily dried and is not dried uniformly in the dryer, and therefore the posture of the green extruded body should be changed so that the end faces of the honeycomb structure, namely, the cut surfaces, are in up and down directions so as to easily evaporate water contained in the honeycomb structure. In addition to this, the green extruded body also should be transferred onto the appropriate support board fitting with the characteristic feature of the dryer, such as the dielectric dryer, the ventilated dryer and the like, and the support board disclosed in U.S. Pat. No. 4,439,929 is suitable for dielectric dryer, and another support board having holes is used for ventilating dryer.

In the conventional manner, the posture changing operation of the green extruded body is done manually because the green extruded body is soft and deformable. In practice, the operator holds up each cut green extruded body with his hands and places it onto the support board while changing the posture of the green extruded body so as not to provide a shock and imprudent pressure. In the honeycomb body, the through holes are arranged closely to each other and their partition walls are extremely thin, thus careful handling is required. Also, the green extruded body should be placed on the support board with the cut surface of the green extruded body and the surface of the support board being kept in parallel: if not, the green extruded body is deformed at the end portion thereof, so that final products are inferior.

It is clear from the above that the manual operation in the extrusion molding is not acceptable for the mass production because the yield and operation efficiency are poor.

SUMMARY OF THE INVENTION

An object of the present invention is to provide an apparatus for changing posture of the green extruded body, which is applicable for the mass production.

Another object of the present invention is to obviate the above mentioned difficulty in handling the green extruded body.

To achieve those objects, an apparatus for changing posture of the green extruded bodies according to the present invention, comprises a first table having a surface for receiving and supporting thereon at least one green extruded body which has been extruded horizontally and shaped into predetermined configuration, said table being rotatable about a first horizontal axis, a second table arranged adjacent to said first table and having a surface for receiving the green extruded body thereon from the first table and supporting said green extruded body, said second table being rotatable about a second horizontal axis which extends parallel with the horizontal axis, and means for causing said first and second tables to rotate about said first and second horizontal axes, respectively, said means, when actuated, maintaining said surfaces of the first and second tables perpendicular to each other so that said green extruded body supported on the first table and whose end surfaces being perpendicular to the surface of the first table is transferred to the second table in standing posture with one end surface of said surfaces of the green extruded body being parallel with the surface of the second table.

Therefore, the first table and second table maintained perpendicular to each other, according to the present invention, are rotated about the relative axes by the rotating means, so that the extruded body supported on the first table is transferred to the second table in standing posture without a shock and imprudent pressure.

BRIEF DESCRIPTION OF THE DRAWINGS

The objects and features of the invention may be understood with reference to the following detailed description of an illustrative embodiment of the invention, taken together with the accompanying drawings in which:

FIG. 2 to FIG. 4 illustrate the movement of the apparatus.

DESCRIPTION OF THE PREFERRED EMBODIMENT

Figure 1:
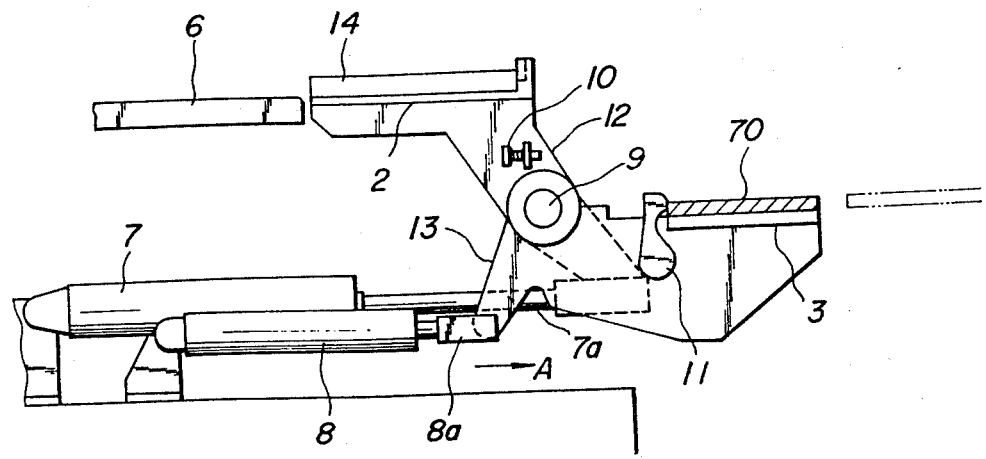
FIG. 1 illustrates a schematic side view of construction of the main part of the apparatus.

FIG. 1 illustrates a schematic side view of an embodiment of the present invention.

As shown in FIG. 1, the apparatus 1 comprises a first table 2 for receiving and supporting a group of holders (i.e. five holders in the present embodiment) transferred from a roller conveyor and holding the green extruded body thereon, a second table 3 arranged adjacent to the first table 2 and supporting a support board 70, and return table 6 for supporting cleared holders after the transfer of the green extruded bodies 100. For example, the present apparatus is applied to one process of the ceramic honeycomb body producing processes and is arranged before the dryer.

In this embodiment, the first table 2 and the second table 3 are rotatably supported to a common shaft 9 through an arm portion 12 of the first table 2 and an arm portion 13 of the second table 3, respectively. A free end of arm portion 12 of the first table 2 is pivotably connected to a piston rod 7a relative to a cylinder 7, while a free end of arm portion 13 is also pivotably connected to a piston rod 8a relative to a cylinder 8, and thus the tables 2 and 3 can be rotated about the shaft 9 through longitudinal movement of the cylinder rods 7a and 8a, respectively.

The first table 2 is provided with a chucker (not shown) at one end thereof to clamp a group of holders between the chucker and a stopper 14 located in the other end of the first table 2. The first table 2 is also provided with a table stopper 10 on the side face of the arm portion 12 of the first table 2. This table stopper 10 contacts with the arm portion 13 of the second table 3 to maintain the first table 2 and the second table 3 perpendicular to each other during the rotational movements of the tables. To this end, the table stopper 10 is preferably adjustable in longitudinal direction thereof.

The second table 3 is provided with board stopper 11 to place the support board 70 in position on the second table 3 and to prevent the support board 70 placed on the second table 3 from moving during the rotational movement of the second table 3. Each of the support boards 70 lifted up by the support board lifter (not shown) is pressed against a lower side belt of the up-down conveyor (not shown) and placed onto the second table 3. By the way, the support board 70 has been formed into a predetermined length so as to support a group of holders at once.

The apparatus 1 described above is operated as follows:

In original position of the apparatus 1, the surface of the first table 2 and the upper surface of the support board 70 placed on the second table 3 are in the horizontal plane, namely each surface is directed upwardly, as shown in FIG. 1.

After the support board 70 is placed on the second table 3, the cylinder 8 is actuated to project the piston rod 8a toward a direction of arrow A, as shown in FIG. 1, whereby the second table 3 is rotated about the shaft 9 in a counterclockwise direction until the angle $\theta_1$ of the upper surface of the support board 70 to the horizontal plane is 60°, and then the second table 3 is maintained on standby, as shown in FIG. 2.

On the other hand, a group of holders 90 (i.e. each of five holders having the green extruded body, respectively) is transferred from the roller conveyor to the first table 2. Thereafter, the chucker arranged at one end of the first table 2 is actuated to contact the side face of a holder, so that a group of holders having the green extruded body is clamped between the chucker and the stopper 14 located in the other end of the first table 2.

In this state, the green extruded body 100 supported on the holder 90 which is in turn placed on the first table 2 is cylindrical ceramic honeycomb structure plain body having an elliptical cross-section, and the opposite end faces thereof, namely the cut surfaces, are perpendicular to the first table 2.

Also, the cylinder 7 is actuated to contract the piston rod 7a toward a direction of arrow B, as shown in FIG. 2, whereby the first table is rotated about the shaft 9 in clockwise direction.

When the angle $\theta_2$ between the surface 2a of the first table 2 and the horizontal plane is 30°, as shown in FIG. 3, a top of the board stopper 10 disposed on the side face of the arm portion 12 contacts with the arm portion 13 of the second table 3. The table stopper 10 may be an adjustable screw and can adjust finely the angle between the tables.

In this case, the surface 2a of the first table 2 and the upper surface of the support board 70 are perpendicular to each other. Thus the cut surface 101 of the green extruded body 100 supported on the holder 90 is parallel to the upper surface of the support board 70, and the cut surface facing to the second table 3 approaches the support board 70.

Continuously, the piston rod 7a of the cylinder 7 is contracted to rotate the first table, the second table 3 is rotated together with the first table 2 because of the contact with the board stopper 10. In this case, the actuating force of the cylinder 8 is adjusted to be smaller than that of the cylinder 7.

Therefore, the first table 2 and the second table 3 are rotated while maintaining the surface 2a of the first table 2 and the upper surface of the support board 70 at right angles. When the angle $\theta_2$ relative to the first table 2 is 90°, in other words, when the angle $\theta_1$ relative to the second table 3 is 0°, the rotational movement of the first table 2 is stopped.

Figure 4:
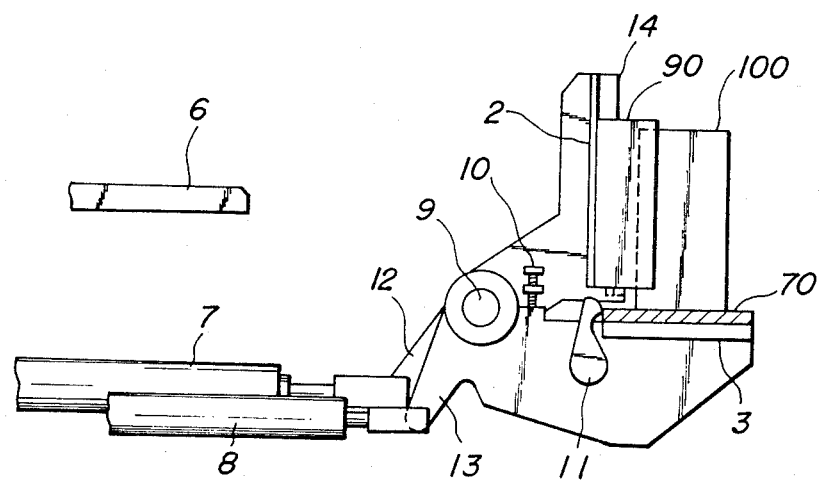

At this time, the green extruded body 100 slides downwardly from the holder 90 through it's own weight to transfer on the support board 70, as shown in FIG. 4. That is, the green extruded body is changed in posture with the cut surface 101 being contacted with the upper surface of the support board 70; this means that the green body is set up at 90° to the support board.

In this case, the distance between the first table 2 and the support board 70, and where the green exturded body 100 falls down is considerably slight and there is little shock against the cut surface 101 of the green extruded body 100. Moreover, as the cut surface 101 is maintained parallel to the upper surface of the support board 70, deformation at the periphery of the end portion of the green extruded body is not provided through the contact with the periphery of the green extruded body and the support board 70.

Then, the piston rod 7a of the cylinder 7 is returned to the initial position thereby to return the first table 2 to the initial position thereof. In this state, only a group of cleared holders is supported on the first table through the chucker.

After the chucker is released, a group of cleared holders 90 is pushed away onto the return table 6 through the pusher, and thus the apparatus is returned to the initial position.

On the other hand, a group of the green extruded bodies 100 transferred onto the support board 70 while changing their posture is fed into the dryer together with the support board 70. In the above description, though the rotating angle $\theta_1$ relative to the second table 3 is 60°, the rotating angle $\theta_1$ is not limited to this and may be alternatively selected within the range of 0° to 90°. In this case, the second table 3 should be rotated at the angle (90°-$\theta_3$) or more, where the angle $\theta_3$ means the rotating angle relative to the first table to the horizontal plane and also means the green extruded body sliding downwardly through it's own weight.

Although the embodiment of the invention has been described with respect to the manufacture of the ceramic honeycomb structure, it is to be understood that the present apparatus is applicable in the other fields as a transferring apparatus for the other soft extruded body which a careful handling is required.

Also, the table stopper 10 in the embodiment simply limits the angle relationship between the tables. Alternatively, for example, the table stopper may have a pressure sensing function, whereby the table stopper 10 senses whether a load applying to the second table 3 exceeds the predetermined value or not, and when the load exceeds the predetermined value, the operational speed of the piston rod 7a of the cylinder 7 (or the rotating speed of the arm portion 13 of the second table 3) is decreased to mitigate the shock applied to the extruded body 100 during the transferring operation.

Also, the table stopper 10 may have a position sensing function, whereby the rotating speed of each of the tables can be decreased when the first table 2 and the second table 3 are approaching the predetermined angle to mitigate the shock applying to the body 100.

In the above described embodiment, the green extruded body 100 is supported on the first table 2 through the holder 90, and it is also apparent that the green extruded body 100 may be placed directly on the first table 2 with the cut surface of the body being perpendicular to the surface of the first table.

According to the present invention, as described above in detail, the green extruded body placed on the first table with the cut surface of the body being perpendicular to the surface of the first table is transferred to the support board placed on the second table by maintaining the rotating movement of the tables at right angles, so that the extruded body on the first table can be transferred to the support board in upright posture without a shock and imprudent force.

Therefore, the soft and deformable green extruded body can be transferred and be changed in it's posture without deformation and destruction.

Also, the transferring operation for the green extruded body, which is carried out manually in a conventional manner, is speeded up and is reliable by the present apparatus, and therefore the mass production for the extrusion molded article can be realized and the high yield may be expected.

What is claimed is:

1. An apparatus for changing posture of green extruded bodies, comprising: a first table having a surface for receiving and supporting thereon at least one green extruded body which has been extruded horizontally and shaped into a predetermined configuration with end surfaces of the extruded body being perpendicular to the surface of said first table, said first table being rotatable about a first horizontal axis, a second table arranged adjacent to said first table and having a surface for receiving an end surface of the green extruded body thereon from the first table and supporting said green extruded body, said second table being rotatable about a second horizontal axis which extends coaxial with the first horizontal axis, and rotational means for causing said first and second tables to rotate about said first and second horizontal axes, respectively, and for transferring said green extruded body from said first table to said second table, said rotational means including stopper means located on said first table and contacting the second table for limiting rotation of said second table by said rotational means to maintain said surfaces of the first and second tables in a perpendicular state relative to each other, and for driving said second table when said first and second tables assume said perpendicular state, said green extruded body supported on the first table and whose end surfaces are perpendicular to the surface of the first table being transferred without deformation to the second table in a standing posture with one end surface of said end surfaces of the green extruded body being parallel to the surface of the second table and perpendicular to the surface of the first table.

2. The apparatus claimed in claim 1, in which each extruded body is received and supported on the first table through a holder which is detachably secured to the first table.

3. The apparatus claimed in claim 1, in which said first and second tables are rotated close to each other by said rotational means and result in being perpendicular to each other.

* * * * *